United States Patent
Nemes (10) Patent No.: US 6,717,745 B2
(45) Date of Patent: Apr. 6, 2004

(54) OPTICAL SYSTEMS AND METHODS EMPLOYING ROTATING CYLINDRICAL LENSES/MIRRORS

(76) Inventor: George Nemes, 1118 Starbird Cir., Suite 23, San Jose, CA (US) 95117

( * ) Notice: Subject to any disclaimer, the term of this patent is extended or adjusted under 35 U.S.C. 154(b) by 0 days.

(21) Appl. No.: 10/143,215

(22) Filed: May 9, 2002

(65) Prior Publication Data

US 2003/0021037 A1 Jan. 30, 2003

Related U.S. Application Data

(60) Provisional application No. 60/290,157, filed on May 9, 2001.

(51) Int. Cl.$^7$ .............................................. G02B 13/12
(52) U.S. Cl. ...................................... 359/710; 359/670
(58) Field of Search ................................ 359/710, 668, 359/669, 670, 671

(56) References Cited

U.S. PATENT DOCUMENTS

| | | | | |
|---|---|---|---|---|
| 2,821,110 A | * | 1/1958 | Cook | 359/670 |
| 3,822,932 A | * | 7/1974 | Humphrey | 351/222 |
| 3,871,748 A | * | 3/1975 | Day | 359/670 |
| 4,523,822 A | * | 6/1985 | Thurston | 351/234 |
| 4,681,406 A | | 7/1987 | Naito et al. | |
| 5,095,386 A | | 3/1992 | Scheibengraber | |
| 5,430,575 A | * | 7/1995 | Sudarshan et al. | 359/434 |

OTHER PUBLICATIONS

Merriam–Webster's Collegiate Dictionary, Tenth Edition, Springfield, Massachusetts, 2001.*

Smith, Warren J., Modern optical engineering, 3rd ed., McGraw–Hill, 2000, pp. 287–289.*

Branescu et al., "Millimeter–wave and microwave beam characterization and propagation using second–order moments: an extension from light optics", in Proc. 7–th Int. Symposium on Recent Advances in Microwave Technology, ISRAMT'99, C. Camacho Penalosa and B.S. Rawat, Eds., CEDMA, Malaga, 1999, pp. 344–347.

Braunecker et al., "Optical system for image rotation and magnification", J. Opt. Soc. Am., vol. 70, No. 2, Feb. 1980, pp. 137–141.

Goldsmith, "Quasioptical Systems: Gaussian Beam Quasioptical Propagation and Applications", IEEE Press/Chapman and Hall, Piscataway, 1998, pp. vii–xv, 1–9.

Nemes et al., "Do not use spherical lenses and free spaces to characterize beams: a possible improvement of the ISO/DIS 11146 document", in Proceedings of the 4–th Int. Workshop on Laser Beams and Optics Characterization, A. Giesen and M. Morin, Eds., VDI Technologiezentrum, Munich, 1997, pp. 29–49.

(List continued on next page.)

Primary Examiner—Scott J. Sugarman
Assistant Examiner—Deborah Raizen
(74) Attorney, Agent, or Firm—Andrei D. Popovici (57) ABSTRACT

An optical system includes a first cylindrical optical element (lens or mirror), and a second cylindrical optical element positioned in a round-spot plane following the first cylindrical optical element. At least one of the cylindrical optical elements is rotatable about the optical axis, relative to the other cylindrical optical element. A collimated light beam is incident on the first cylindrical optical element. Rotating the cylindrical optical elements relative to each other allows changing the size of a round spot or scaling an image at a given output location. In one implementation, two positive-magnification cylindrical lenses of focal length f are separated by a distance 2f. Rotating one of the lenses about the optical axis changes the diameter of a round spot (or symmetrically scales an image) at a fixed position away from the second lens.

43 Claims, 6 Drawing Sheets

OTHER PUBLICATIONS

Nemes et al., "Laser beam characterization with use of second order moments: an overview", in Diode Pumped Solid State (DPSS) Lasers: Applications and Issues, OSA TOPS vol. 17, M.W. Dowley, Ed., OSA, Washington, DC, pp. 200–207, 1998.

Nemes et al., "Measurement of all ten second–order moments of an astigmatic beam by the use of rotating simple astigmatic (anamorphic) optics", J. Opt. Soc. Am. A 11, 2257–2264 (1994).

Nemes et al., "The ten physical parameters associated with a full general astigmatic beam: a Gauss–Schell–model", in Proceedings of the 4–th Int. Workshop on Laser Beams and Optics Characterization, A. Giesen and M. Morin, Eds., VDI Technologiezentrum, Munich, 1997 pp. 92–105.

Nemes, "Synthesis of general astigmatic optical systems, the detwisting procedure, and the beam quality factors for general astigmatic laser beams", in Proc. 2–nd Int. Workshop on Laser Beam Characterization, H. Weber et al. Eds., Berlin, 1994, pp. 93–104.

Serna et al., "Complete spatial characterization of a pulsed doughnut–type beam by use of spherical optics and a cylindrical lens", J. Opt. Soc. Am. A, 18 (7), 1726–1733 (2001).

Siegman, "New developments in laser resonators", SPIE Proc. vol. 1224, pp. 2–14 (1990).

Wang et al., "General linear optical coordinate transformations", J. Opt. Soc. Am. A/vol. 17, No. 10/Oct. 2000, pp. 1864–1869.

* cited by examiner

FIG. 9

OPTICAL SYSTEMS AND METHODS EMPLOYING ROTATING CYLINDRICAL LENSES/MIRRORS

RELATED APPLICATION DATA

This application claims the priority date of U.S. Provisional Patent Application No. 60/290,157, filed May 9, 2001, which is herein incorporated by reference.

FIELD OF THE INVENTION

The invention relates to optical systems and methods for magnifying images or controlling the sizes of laser spots or optical images, and in particular to optical systems and methods employing rotating cylindrical lenses and/or mirrors.

BACKGROUND OF THE INVENTION

Microscopes, image projectors, industrial laser optical systems, and various other optical systems have been used to control the sizes of images at a target location. Many such optical systems employ lenses and/or mirrors which are translated relative to each other along the optical axis of the system in order to control the output image size. In some systems, changing the size of the image alters the location of the plane at which the image is in focus. Moreover, some conventional systems can be relatively bulky, and require complex mechanical components.

SUMMARY OF THE INVENTION

The present invention provides an optical system comprising a first cylindrical optical element for receiving an input light beam, and a second cylindrical optical element positioned at a round spot location optically subsequent to the first cylindrical optical element. At least one of the cylindrical optical elements is rotatable about the optical axis so as to adjust an angle between the principal axes of the cylindrical optical elements to symmetrically scale a light beam spot at a target location.

Further provided is an optical method comprising: generating a symmetrically-scalable spot on a target positioned at a working location by passing a light beam sequentially through a first cylindrical optical element and a second cylindrical optical element, the second cylindrical optical element being separated from the first cylindrical optical element by a distance chosen such that an input beam forms a circular spot at the second cylindrical optical element after passing through the first cylindrical optical element; and symmetrically scaling the spot at the working location by adjusting an angle between a principal axis of the first cylindrical optical element and a principal axis of the second cylindrical optical element by rotating at least one of the first cylindrical optical element and the second cylindrical optical element.

BRIEF DESCRIPTION OF THE DRAWINGS

The foregoing aspects and advantages of the present invention will become better understood upon reading the following detailed description and upon reference to the drawings where:

FIGS. 2-A and 2-B are schematic diagrams illustrating the passage of a light beam through the system of FIG. 1, for two extreme angular lens positions, respectively.

FIGS. 6-A and 6-B are schematic diagrams illustrating the passage of a light beam through yet another system configuration according to the present invention, for two extreme angular lens positions, respectively.

DETAILED DESCRIPTION OF THE INVENTION

In the following description, it is understood that, unless explicitly specified otherwise, all recited distances are optical distances, which may or may not be equal to physical (free space) distances between optical elements. The terms "round spot" and "circular spot" are not limited to spots of uniform intensity, and are understood to encompass modulated, symmetrically-scaleable images encoding patterns/pictures. Such images may be projected on a target screen for example. A "round spot" position of an optical element of a system is understood to be a position at which an input round spot is transformed to an output round spot by the part of the optical system optically preceding the optical element. Adjusting angles between the cylindrical axes of optical elements refers to adjusting optical angles, i.e. angles between the cylindrical axis of the elements and the direction of the transverse (vertical or horizontal) axis at the cylindrical element location. The statement that a second optical element is rotatable with respect to a first optical element is understood to encompass rotating either or both of the optical elements.

The following description illustrates embodiments of the invention by way of example and not necessarily by way of limitation.

The general terminology and concepts employed in the ensuing description are discussed below.

Terminology and Concepts

An optical system comprising spherical and cylindrical lenses and/or mirrors, and sections of free spaces, can be described mathematically by a 4×4 real matrix called the ABCD matrix. For simplicity, such a system can be considered to be made of centered, aligned, lossless, passive, and aberration-free elements. The ABCD matrix has specific mathematical properties (called symplecticity) which can limit the maximum number of the independent matrix elements to ten. In a first order approximation, most optics belong to this category. These optical systems are called ABCD-type systems. The beams propagate aligned to the ABCD-type optical systems.

A beam is a distribution of light in free space that does not depart too far away from a reference axis. Such a distribution can be termed a paraxial distribution. The reference axis coincides with the beam axis. The beam axis is rigorously determined by using the first-order moments of the beam irradiance (sometimes termed "intensity"). For consistency, in the following discussion the z-axis is the beam axis, and the x- and y-axes represent the horizontal and the vertical transverse laboratory axes, respectively.

The main physical quantities characterizing the simplest beam can be defined using the second-order moments of the beam irradiance. They are, according to the International Standard Organization (ISO): the beam waist radius $w_0$ (half-diameter), the beam waist size (full diameter) $D_0$, the waist location $z_0$, the beam divergence (full angle) $\theta$, the Rayleigh range $z_R$, ($z_R=D_0/\theta$), and the beam propagation parameter $M^2$. The beam propagation parameter is also named the times-diffraction-limit factor. These quantities are defined for a stigmatic (ST) beam, which is rotationally-symmetric about the z-axis, and forms a round spot everywhere in free-space propagation.

These quantities do not rigorously apply to the so-called pseudo-stigmatic beam, which is also rotationally symmetric in free-space propagation, but contains a hidden non-symmetrical parameter. This hidden parameter may not manifest itself in beam propagation through any rotationally symmetric optics, including the free-space, but it may appear in beam propagation through cylindrical optics. The beam propagation parameter $M^2$ remains constant in beam propagation through rotationally-symmetric ABCD-type optical systems, and therefore represents a beam characteristics. It has a value which is always $\geq 1$. Generally, the closer the beam parameter value is to 1, the better the beam quality is considered to be.

Consider the beam parameter product, or the product between the waist size and the divergence angle for a ST beam:

$$D_0\theta=4M^2\lambda/\pi \quad [1]$$

where $\lambda$ is the wavelength of the laser light or the average wavelength of the white light. The lower the $M^2$ value, the smaller the "beam parameter product," and the better localized the laser beam in the near-field ($w_0$ or $D_0$) and the far-field ($\theta$) simultaneously.

The physical properties of a beam can be described mathematically by a 4×4 real, symmetric, and positive definite beam matrix containing all the beam second-order moments. There are a maximum of ten independent such moments. The relevant information on the beam propagation properties and on the beam physical parameters is contained in this beam matrix. The 4×4 matrix is usually written as four 2×2 submatrices. The symmetry of these 2×2 submatrices determines the beam symmetry properties.

A stigmatic (ST) beam is a beam which has its four 2×2 submatrices proportional to the identity matrix. Therefore a ST beam has at most three independent parameters. It has also a rotational symmetry in free space. Not all rotationally symmetric beams are necessarily ST beams.

An aligned simple astigmatic (ASA) beam is a beam which has all its four 2×2 submatrices diagonal. Therefore an ASA beam has at most six independent parameters: three for each transverse coordinate, x and y. An ASA beam has different propagation and physical parameters in the two independent transverse directions, x and y. An ASA beam has two beam propagation parameters, $M^2_x$ and $M^2_y$, which for some beams are equal (intrinsic stigmatic, or IS, beams), and for some other beams are not equal (intrinsic astigmatic, or IA, beams). An ASA beam has an orthogonal symmetry of its transverse irradiance ("intensity") profile everywhere along its axis in free-space propagation. An ASA beam keeps the same ASA symmetry and preserves its $M^2_x$ and $M^2_y$ factors by propagation through aligned cylindrical optics and rotationally-symmetric optics.

A general astigmatic (GA) beam is a beam which has two 2×2 non-symmetrical submatrices. Some GA beams may have non-orthogonal symmetry in their transverse irradiance profile in free-space propagation. Such beams are called twisted-irradiance beams, or simply, twisted beams. There are also GA beams with rotational symmetry and GA beams with orthogonal symmetry in propagation through free-space and spherical optics, but not through cylindrical optics. Such beams are generally called pseudo-symmetrical beams, or more specifically pseudo-ST (PST), and pseudo-ASA (PASA) beams, respectively, or twisted-phase beams. The maximum number of independent elements of the GA beam matrix is ten.

Any GA beam can be transformed (detwisted, or decoupled) up to an ASA beam (with $M^2_x \neq M^2_y$) or up to a ST beam (with $M^2_x = M^2_y = M^2$), by using spherical and cylindrical lenses, mirrors, and sections of free-space or ABCD-type optics.

The intrinsic astigmatism parameter, a, is an invariant beam parameter which is a function of all ten second-order moments of a beam, which discriminates between the only two existing disjoint classes of beams: intrinsic stigmatic (a=0), and intrinsic astigmatic (a>0). The intrinsic astigmatism parameter a remains constant at beam propagation through ABCD-type optics, even though the beam symmetry changes during its propagation. The intrinsic astigmatism parameter a is a measure of the difference between the two beam propagation parameters, $M^2_x \neq M^2_y$, defined for the beam transformed into its simplest, ASA-type symmetry:

$$a=(\tfrac{1}{2})(M^2_x-M^2_y)_2. \quad [2]$$

An intrinsic stigmatic (IS) beam is a beam which, irrespective of its symmetry in free space (round, orthogonal, or even non-orthogonal), is obtained from or can be transformed into a ST beam by using only ABCD-type optics. An intrinsic astigmatic (IA) beam is a beam which cannot be obtained from (or transformed into) a ST beam by using only ABCD-type optics. An IA beam has a>0, and therefore cannot normally be transformed into a beam with a=0 by using the above mentioned ABCD-type optics. A collimated beam is a beam for which its Rayleigh range is much greater (usually at least 10 times greater) than all the characteristic lengths of intervening optics (free-spaces and focal lengths of the lenses).

The systems and methods described below preferably employ IS, collimated beams, either with ST symmetry (round shape in free space), or with ASA symmetry (orthogonal symmetry in free space with the elliptical spot aligned to the horizontal and vertical axes). Typical examples of ST beams are the collimated beams of virtually all types of lasers, including beams from diode lasers which are passed through low-order mode fiber and then collimated to become ST beams. Typical examples of IS beams with ASA symmetry are the collimated beams with elliptical beam spots in free space of index-guided diode lasers without fiber optics.

The degree to which a beam is intrinsic stigmatic is approximate. The degree depends on the errors of measuring its parameters, and to the degree to which we want to obtain the desired parameters, especially spot roundness. An IS beam can be defined as that one for which the parameter a is much less than the square of the geometrical mean (and therefore also of the arithmetic mean) of the two beam propagation parameters, $M^2_x$ and $M^2_y$:

$$a >> M^2_x M^2_y \quad [3]$$

Alternatively, an IS beam can be defined as a beam having the ratio between the two different $M^2_{x,y}$ close to one, or more precisely:

$$1-\epsilon < M^2_x/M^2_y > 1+\epsilon \qquad [4]$$

where $\epsilon$ is a positive small number, $\epsilon<<1$, to be conventionally specified. A collimated beam having in any transverse section a spot with the aspect ratio (the ratio between the major and the minor axis of the transverse irradiance spot) of 1.15:1, is considered a round beam everywhere along its axis according to ISO 11146 document. This beam is approximately an IS beam. The above criterion gives approximately $\epsilon \approx 0.15$ and also $$a \leq (\frac{1}{2})\epsilon^2 M^2_x M^2_y \approx 0.01 M^2_x M^2_y \qquad [5]$$

For example, using the above criteria to test whether a beam is IS or IA, a high power YAG:Nd laser with some intrinsic astigmatism, $M^2_x=40$ and $M^2_y=46$, can still be considered IS, having a=18<18.4, and $\epsilon=0.15$; however, if the beam has slightly different values of $M^2$, i.e. 40 and 50, then it is IA, because a=50 is not <20, and $\epsilon=0.2>0.15$. Similarly, a beam from a diode laser having $M^2_x$32 1.5 and $M^2_y=1.7$ can be considered also IS, having a=0.02<0.026, and $\epsilon=0.13<0.15$. Alternatively, a beam from a pulsed $N_2$ laser having $M^2_x=9$ and $M^2_y=12$ is an IA one, because a=4.5 which is not <1.08, and $\epsilon=0.33>0.15$.

The description of preferred embodiments below will ordinarily employ the thin lens approximation, which neglects the physical thickness of any lenses relative to their focal lengths. The optics (lenses, mirrors) will be considered aberration-free. Each optical element and the whole optical system is considered an ABCD-type system.

All the concepts and optical configurations will be illustrated specifically for laser beams, i.e., for coherent electromagnetic waves with wavelength in the range of 0.1 micrometers to 100 micrometers. Similar optical configurations can be implemented for coherent electromagnetic waves with longer wavelengths, in the millimeter and centimeter microwave range called the quasi-optical domain, by using specific components for the quasi-optics equivalent to the ABCD-type optical systems.

Preferred Embodiments

Two main beam configurations will be treated in sequence: collimated ST beams (with rotational symmetry), and collimated ASA beams (with orthogonal symmetry). Each of these beam configurations has several different embodiments, depending on the operation mode: image-mode, projection-mode, and focus-mode. For each main case, a generating configuration will be described first, to allow an analysis of the properties of this configuration, and allow an easy understanding of subsequent configurations and embodiments based on that generating configuration.

(I) Configurations for Collimated Stigmatic (ST) Beams

1. Image Mode

Figure 1:
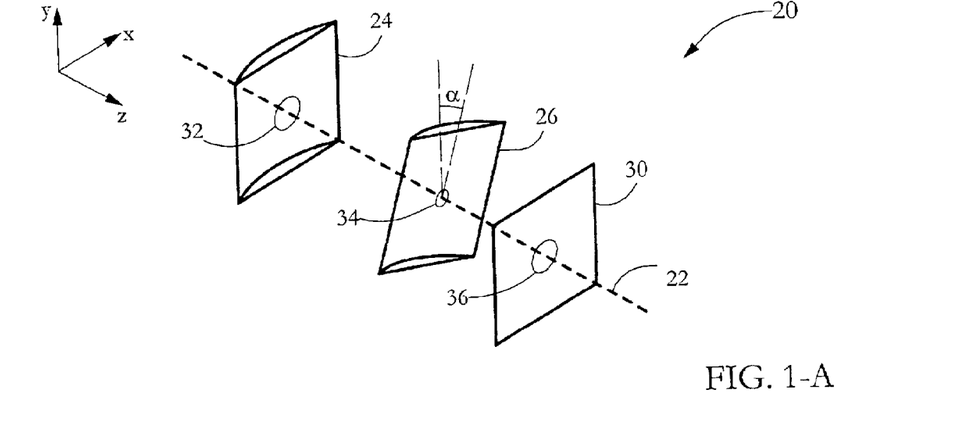
FIG. 1 is a schematic diagram of an optical system comprising two cylindrical lenses, according to a presently preferred embodiment of the present invention.

FIGS. 1-A and 1-B show schematic isometric and side views, respectively, of a two-lens optical system configuration 20 according to the present invention. The optical axis (z-axis) is shown at 22. A first (input) cylindrical lens 24 is placed along optical axis 22 such that lens 24 is converging along the x axis. First lens 24 is a positive-focus lens, and has a cylindrical focal length $f_1$. A second (output) cylindrical lens 26 is placed along optical axis 22, approximately at an optical distance $2f_1$ behind lens 24, as discussed below. As illustrated in FIGS. 1-A and 1-B, lenses 24 and 26 are preferably separated by free space. In general, one or more lenses and/or mirrors could be placed between lenses 24, 26, while still allowing the positioning of second lens 26 at the round-spot location following first lens 24. Second lens 26 can be a positive or negative focus lens, and has a cylindrical focal length $f_2$. The cylindrical axis of lens 26 is rotated about the z-axis with an angle a with respect to the cylindrical axis of first lens 24.

Consider an incoming collimated, ST, rotationally symmetric beam incident on first lens 24, with a waist of diameter Do at first lens 24. The beam has an elliptical cross-section in the space between lenses 24, 26. Second lens 26 is located in the plane where there is again a round spot after first lens 24, at or very close to a distance $2f_1$ from first lens 24. If the incoming beam is ideally collimated, second lens 26 is exactly $2f_1$ away from first lens 24. If the incoming beam is slightly convergent (or divergent), the round spot is situated at a distance slightly shorter (or longer) than $2f_1$. Second cylindrical lens 26 is placed in the plane of this round spot after first cylindrical lens 24.

There is always a round spot after first lens 24 if the incoming beam is a ST, rotationally symmetric, collimated beam. In classical optics this round spot is also called the circle of least confusion for the ASA beam created by first lens 24. An output round spot of an adjustable diameter $D(\alpha)$ is generated at an output transverse plane or screen 30 located at a fixed distance $d_{20}$ after second lens 26, provided the following conditions are met:

$$f_2 > 0 \qquad [6.1]$$

$$f_2 < f1 \qquad [6.2]$$

$$d_{20} > 0. \qquad [6.3]$$

Conditions [6.1–3] specify, respectively, that second cylindrical lens 26 is converging, second cylindrical lens 26 is more powerful than first cylindrical lens 24, and the output round spot is after second lens 26, and real, i.e., can be seen on screen 30.

The distance $d_{20}$ at which the real spot is round can be called the image distance. The distance $d_{20}$ is given by:

$$d_{20}=2/(1/f_2-1/f_1)=2f_2/(1-f_2/f1)>2f_2 \qquad [7]$$

The diameter of the real round spot is adjustable by changing the angle $\alpha$ of second cylindrical lens 26 according to the equation (exact formula):

$$D(\alpha)=D_0[1+4(f_1/z_R)^2/(1-f_2/f_1)^2+(4-f_2/f_1)\sin^2(\alpha)/(1-f_2/f_1)^2]^{1/2} \qquad [8.1]$$

Eq. [8.1] can be rewritten as:

$$D(\alpha)=D_0 K(\alpha), \qquad [8.2]$$

where $K(\alpha)>1$ is the variable magnification factor, or variable scale factor.

For well collimated beams ($f_1/Z_R \to 0$), in the geometrical optics approximation (marked by the index g), eq. [8] becomes:

$$D_g(\alpha)=D_0[1+(4f_2/f_1)\sin^2(\alpha)/(1-f_2/f_1)^2]^{1/2}=D_0 K_g(\alpha). \qquad [9]$$

The minimum output spot size corresponds to $\alpha=0$, i.e. an orientation of the cylindrical axis of second cylindrical lens 26 parallel to the cylindrical axis of first lens 24. The minimum spot size $D_m=D(0)$ is given by:

$$D_m=D(0)=D_0[(1-f_2/f_1)^2+4(f_1/z_R)^2]^{1/2}/(1-f_2/f_1) \qquad [10.1]$$

In the geometrical optics approximation, eq. [10.1] can be rewritten as:

$$D_{mg}=D_g(0)=D_0 \quad [10.2]$$

The maximum spot size corresponds to $\alpha=90°$, i.e. an orientation of the cylindrical axis of second cylindrical lens 26 perpendicular to the cylindrical axis of first lens 24. The maximum spot size is given by:

$$D_M=D(\pi/2)=D_0[(1+f_2/f_1)^2+4(f_1/z_R)^2]^{1/2}/(1-f_2/f_1). \quad [11.1]$$

In the geometrical optical approximation the maximum spot size is:

$$D_{Mg}=D_g(\pi/2)=D_0(1+f2/f1)/(1-f2/f1)=D_0(f1+f2)/(f1-f2), \quad [11.2]$$

which is $>D_0$.

If we define the dynamic range factor K as the ratio of the maximum to the minimum spot size, $$K=D_M/D_m \quad [12.1]$$

we obtain (exact formula):

$$K=[(1+f2/f1)^2+4(f1/z_R)^2]^{1/2}/[(1-f2/f1)^2+4(f_1/z_R)^2]^{1/2} \quad [12.2]$$

In the geometrical optics limit, eqs. [12.1–2] can be rewritten as:

$$K_g=D_{Mg}/D_{mg}=(1+f_2/f_1)/(1-f_2/f1). \quad [13]$$

A dynamic range K of 2–20 can be readily obtained by appropriately selecting the values of $f_1$ and $f_2$.

By placing a transparency (object) either on the first cylindrical lens 24, or on the second lens 26, in a fixed, aligned position with respect to the x and y axes, an adjustable size, proportional image is generated at screen 30. The image at screen 30 is rotated by an angle $2\alpha$. If the transparency/image is placed on the second cylindrical lens 26 and rotated together with it, the image at screen 30 is a fixed, aligned image, with a variable scale factor depending on $\alpha$ according to the equations above. For a laser beam, a certain transverse irradiance profile at the waist on the first cylindrical lens 24 can be replicated at screen 30 with an adjustable scale factor given by the equations above. The input irradiance profile can be for example a circular top-hat (uniform, rotationally-symmetric) profile, which is of particular use in industrial and medical laser applications.

The configuration shown in FIGS. 1-A and 1-B is useful for replicating and scaling a certain irradiance profile with an adjustable scale factor $K(\alpha)=2-20$ at a fixed distance $d_{20}$, or to project some images at a fixed distance $d_{20}$ with an adjustable scale factor $K(\alpha)$.

If in the above generating configuration the second cylindrical lens 26 is either positive but weaker than the first one, f2>f1, or is negative, $f2=-|f2|$, the distance $d_{20}$ becomes negative, i.e., the beam after the second lens 26 is never round. However, there is a virtual round spot located before the second lens 26, which can be converted into a real round spot by using an additional spherical relay lens L after the second lens 26. The virtual round spot located at $-|d_{20}|$ becomes a virtual object for the spherical lens L which, with appropriate focal length and positioning, can give a real image of the round spot. Overall, the adjustable virtual round spot is transformed into a real adjustable round spot. The specific values of the "virtual image distance"$-|d_{20}|$, and of the "virtual round spot size" $D_v(\alpha)$ are relevant in this configuration, because the image location and size after the relay lens L (or after any imaging system) can be determined straightforwardly.

For a positive but weaker second cylindrical lens, f2>f1, the distance from the second cylindrical lens to the virtual round spot plane located before the second lens is:

$$d_{20}=-2/(1/f_1-1/f_2)=-2f_2/(f_2/f_1-1)=-|d_{20}| \quad [14]$$

The adjustable virtual round spot size is (exact formula, where the index v stands for "virtual"):

$$D_v(\alpha)=D_0[1+4(f_1/z_R)^2/(f_2/f_1-1)^2+(4f_2/f_1)\sin^2(\alpha)/(f_2/f_1-1)^2]^{1/2}, \quad [15.1]$$

which can be rewritten as $$D_v(\alpha)=D_0K_v(\alpha). \quad [15.2]$$

For collimated beams, or geometric optics approximation $(f1/z_R \to 0)$, eq. [15.2] becomes $$D_{vg}(\alpha)=D_0[1+(4f_2/f_1)\sin^2(\alpha)/(f_2/f_1-1)^2]^{1/2}=D_0K_{vg}(\alpha). \quad [16]$$

The minimum virtual spot size $D_{vm}$ is given by (for $\alpha=0$, exact formula):

$$D_{vm}=D_v(0)=D_0[(f_2/f_1-1)^2+4(f_1/z_R)^2]^{1/2}/(f_2/f_1-1) \quad [17.1]$$

In the geometric optics approximation the minimum virtual spot is:

$$D_{vmg}=D_{vg}(0)=D_0 \quad [17.2]$$

The maximum spot size is given by (for $\alpha=90°$, exact formula):

$$D_{vM}=D_v(\pi/2)=D_0[(f_2/f_1+1)^2+4(f_1/z_R)^2]^{1/2}/(f_2/f_1-1) \quad [17.3]$$

In geometrical optics approximation the maximum spot size is:

$$D_{vMg}=D_{vg}(\pi/2)=D_0(f_2/f_1+1)/(f_2/f_1-1)=D_0(f_2+f_1)/(f_2-f_1) \quad [17.4]$$

The dynamic range factor $K_v$ (exact) or $K_{vg}$ (geometrical optics) is:

$$K_v=[(f_2/f_1+1)^2+4(f_1/z_R)^2]^{1/2}/[(f_2/f_1-1)^2+4(f_1/z_R)^2]^{1/2} \quad [17.5]$$

$$K_{vg}=(f_2/f_1+1)/(f_2/f_1-1)=(f_2+f_1)/(f_2-f_1) \quad [17.6]$$

For a negative second cylindrical lens 26, $f_2=-|f_2|<0$, the focal length of the second cylindrical lens 26 is unrestricted by the focal length of the first cylindrical lens 24. The distance from the second cylindrical lens 26 to the virtual round spot plane located before second lens 26 is:

$$d_{20}=-2/(1/f_1+1/|f_2|)=-2|f_2|/(1+|f_2|/f_1)=-|d_{20}| \quad [18.1]$$

The adjustable virtual round spot size $D_v(\alpha)$ is (exact formula):

$$D_v(\alpha)=D_0[1+4(f_1/z_R)^2/(1+|f_2|/f_1)^2-(4|f_2|/f_1)\sin^2(\alpha)/(1+|f_2|/f_1)^2]^{1/2} \quad [18.2]$$

which becomes for collimated beams, or geometric optics approximation $(f_1/z_R \to 0)$:

$$D_{vg}(\alpha)=D_0[1-(4|f_2|/f_1)\sin^2(\alpha)/(1+|f_2|/f_1)^2]^{1/2} \quad [18.3]$$

Equations [18.2–3] can be rewritten as:

$$D_v(\alpha)=D_0K_v(\alpha), \quad D_{vg}(\alpha)=D_0K_{vg}(\alpha). \quad [18.4]$$

The minimum virtual spot size $D_{vm}$ is obtained for $\alpha=90°$ and is given by:

$$D_{vm}=D_v(\pi/2)=D_0[(1-|f_2|/f_1)^2+4(f_1/z_R)^2]^{1/2}/(1+|f_2|/f_1) \quad [18.5]$$

In geometric optics approximation it is:

$$D_{vmg}=D_{vg}(\pi/2)=D_0|1-|f_2|/f_1|/(1+|f_2|/f_1)=D_0|f_1-|f_2||/(f_1=|f_2|) \quad [18.6]$$

The maximum virtual spot size is given by (for $\alpha=0$):

$$D_{vM}=D_v(0)=D_0[(1+|f_2|/f_1)^2+4(f_1/z_R)^2]^{1/2}/(1+|f_2|/f_1) \quad [18.7]$$

In geometric optics approximation it is:

$$D_{vMg}=D_{vg}(0)=D_0 \quad [18.8]$$

The dynamic range factor $K_v$ (exact formula) and its counterpart $K_{vg}$ in geometrical optics are:

$$K_v=[(1+|f_2|/f_1)^2+4(f_1/z_R)^2]^{1/2}/[(1-|f_2|/f_1)^2+4(f_1/z_R)^2]^{1/2} \quad [18.9]$$

$$K_{vg}=(1+|f_2|/f_1)/|1-|f_2|/f_1|=(f_1+|f_2|)/|f_1-|f_2|| \quad [18.10]$$

While it is possible to use a relay spherical lens also for a real round spot, in the configuration of FIGS. 1-A–B, for practical applications any of the configurations with a virtual round spot can be more advantageous because they allow a relatively shorter overall length of the total configuration (two cylindrical lenses and a spherical lens).

A negative first cylindrical lens can be used in conjunction with a positive or negative second cylindrical lens, by positioning an appropriate spherical lens between the two cylindrical lenses such that the second cylindrical lens is situated in the round-spot plane following the first spherical lens.

2. Projection Mode

In the configuration of FIGS. 1-A and 1-B, the image distance $d_{20}$ can be chosen to be infinity, $d_{20} \to \infty$, by having both cylindrical lenses 24, 26 positive and of equal focal length, f. A real round spot of adjustable size is then located far away from the second cylindrical lens 26. That spot has all the properties of the real round and adjustable spot from a finite image distance. Therefore, a variable size image can be projected on a screen located far away from the second cylindrical lens 26.

Figure 2:
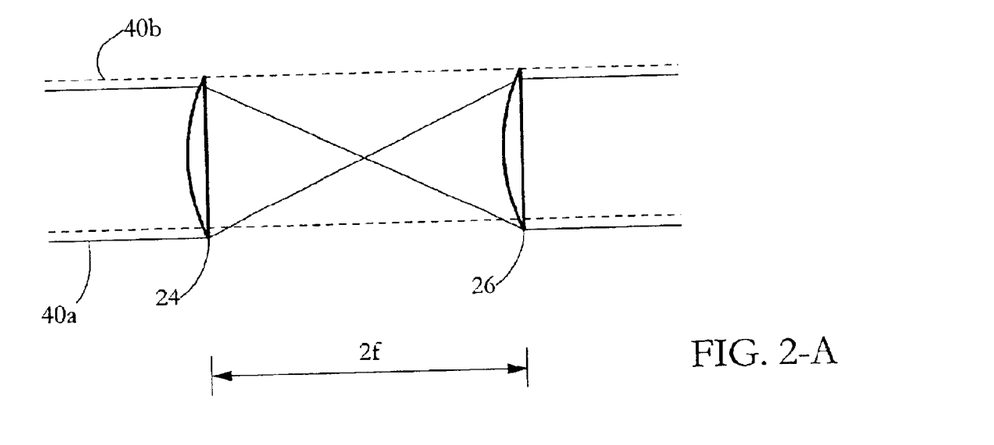

Consider the optical system of FIGS. 1-A–B, with $f_1=f_2=f>0$. FIGS. 2-A and 2-B show a schematic geometric optics illustration of the passage of a light beam through system 20, for two extreme angular positions of second lens 26, respectively. FIG. 2-A corresponds to parallel cylindrical axes for the two lenses 24, 26, while FIG. 2-B corresponds to mutually perpendicular cylindrical axes.

An incoming, perfectly collimated round beam has a diameter $D_0$ and substantially zero divergence. The beam divergence, $D_0/z_R$, is close to zero for a well-collimated beam. In the parallel-orientation configuration shown in FIG. 2-A, first lens 24 focuses the x-distribution 40a of the incoming beam at a distance f, and leaves the y-distribution 40b of the incoming beam unaltered. Second lens 26 recollimates the x-distribution 40a, and leaves unchanged the y distribution of the beam (with dotted line in FIG. 2). After passage through second lens 26, the output light beam is collimated.

In the perpendicular-orientation illustrated in FIG. 2-B, the second cylindrical lens 26 is rotated perpendicular to the first cylindrical lens 24. First lens 24 acts only on the x-distribution 44a of the light beam, while second lens 26 acts only on the y-distribution 44b of the light beam. The x-distribution 44a of the beam is focused by the first cylindrical lens 24, and remains divergent after the second cylindrical lens 26. The y-distribution 44b of the beam is collimated until the second cylindrical lens 26, and then leaves the second cylindrical lens as a converging, and then diverging y-distribution. At a distance far enough from the second cylindrical lens 26, both x-distribution 44a and y-distribution 44b have the same maximum divergence, which is, in geometrical optics approximation, $\theta_M = D_0/f$. By rotating the second cylindrical lens 26, a variable divergence can be varied between a minimum value $(D_0/z_R$, which is near zero,) and a maximum value $(D_0/f)$. A rigorous result can be obtained from Eqs. [7] and [8] by defining the variable divergence $\theta(\alpha)$ as the limit (for $d_{20} \to \infty$, or for $f2 \to f1=f$):

$$d_{20} = \lim_{f2 \to f1=f}[2/(1/f_2-1/f_1)] = \infty \quad [19.1]$$

$$\theta(\alpha) = \lim_{\substack{d_{20} \to \infty, \text{or} \\ f2 \to f1=f}} D(\alpha)/d_{20} = (D_0/f)[(f/z_R)^2 + \sin^2(\alpha)]^{1/2} \quad [19.2]$$

In geometrical optics approximation the following variable divergence $\theta_g(\alpha)$ results:

$$\theta_g(\alpha) = \lim_{\substack{d_{20} \to \infty, \text{or} \\ f2 \to f1=f}} D_g(\alpha)/d_{20} = (D_0/f)\sin(\alpha) \quad [19.3]$$

which gives correct results for $\alpha \neq 0$. For $\alpha=0$, the exact formula below gives the correct result of the minimum divergence:

$$\theta_m = \theta(0) = D_0/z_R = \theta_{in}, \quad [19.4]$$

where $\theta_{in}$ is the initial divergence of the incoming beam. Note that in the geometrical optics approximation we have the non-physical result:

$$\theta_{mg}(0) = \theta_g(0) = 0. \quad [19.5]$$

The maximum divergence is obtained for $\alpha=90°$ and is given by (the exact formula and the geometrical optics, respectively):

$$\theta_M = \theta(\pi/2) = (D_0/f)[1+(f/z_R)^2]^{1/2} \quad [19.6]$$

$$\theta_{Mg} = \theta_g(\pi/2) = D_0/f \quad [19.7]$$

The dynamic range factor K, defined as $K=\theta_M/\theta_m$ (exact formula) and its geometrical optics counterpart $K_g$ are given by:

$$K=[1+(z_R/f)^2]^{1/2} \quad [19.8]$$

$$\theta_M = \theta(\pi/2) = (D_0/f)[1+(f/z_R)^2]^{1/2} \quad [19.6]$$

$$\theta_{Mg} = \theta_g(\pi/2) = D_0/f \quad [19.7]$$

Desired values for the ratio K or $K_g$ in Eqs. [19.6–9] between the maximum and minimum image size at a certain distance d can be obtained by using the optical system of FIGS. 1-A–B to project an image with variable magnification as described above. The maximum, $D_M$, and the minimum, $D_m$, image size at the distance d, such as $f \ll d \ll z_R$, are given by multiplying the maximum and the minimum divergence with the distance d:

$$K = [1 + (z_R/f)^2]^{1/2} \qquad [19.8]$$

$$K_g = \lim_{z_R \gg f} K = z_R/f \qquad [19.9]$$

Figure 3:
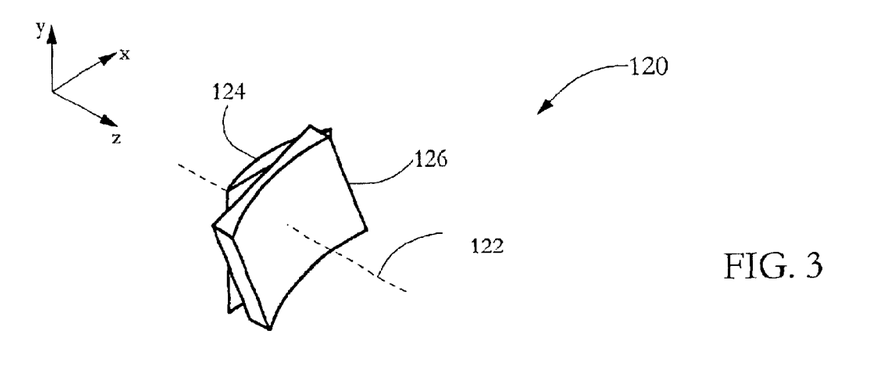
FIG. 3 illustrates another system configuration according to the present invention.

Consider now a projection-mode optical system with positive and negative cylindrical lenses of equal absolute power, $f_2=-f_1=-f$. FIG. 3 shows an isometric view of a system 120 having two such lenses 124, 126 placed as close to each other as mechanically possible. The optical axis of system 120 is illustrated at 122. Either one or both of the two lenses can be rotated with respect to each other as described above. The system of FIG. 3 is functionally similar to a projection-mode system implemented in the configuration shown in FIGS. 1-A–B. The system of FIG. 3 can act either as a variable divergence optical system for a laser beam, or as a variable magnification projection system. In such a variable-magnification projection system, a collimated white light beam can be used at its input, and a transparent object can be attached to the rotating lens. The target projection screen is preferably positioned at a distance at least ten times larger than the magnitude of the focal length f. Ideally, in the system of FIG. 3, the two cylindrical lenses 124, 126 are infinitely thin and superimposed at the same physical location. In practice, cylindrical lenses such as lenses 124, 126 have finite thicknesses. As a result, lenses 124, 126 may not cancel each other when aligned.

Figure 4:
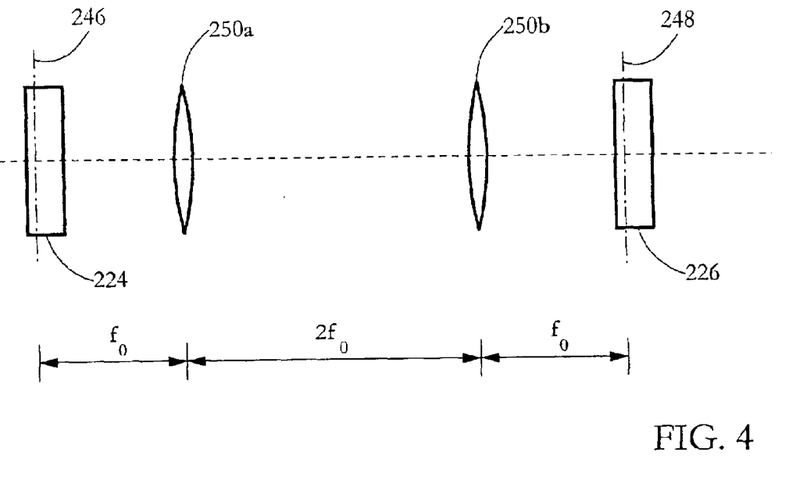
FIG. 4 shows another system configuration according to the present invention.

FIG. 4 shows a schematic side view of an optical system 220 which images a focal plane 246 of a positive input cylindrical lens 224 to a focal plane 248 of a negative output cylindrical lens 226. Two identical, positive-magnification spherical lenses 250a–b of focal length $f_0$ are positioned between cylindrical lenses 224, 226 in a −1 magnification afocal configuration. Lenses 250a–b are separated by a distance $2f_0$. The first principal plane 246 of the first cylindrical lens 224 coincides with the front focal plane of a first spherical lens 250a. The first principal plane 248 of the second cylindrical lens 226 coincides with the back focal plane of the second spherical lens 250b. The total physical length of the configuration is approximately $4f_0$. The first principal planes of lenses 224, 226 coincide. Similarly, the second principal planes of lenses 224, 226 coincide.

3. Focus Mode

Figure 5:
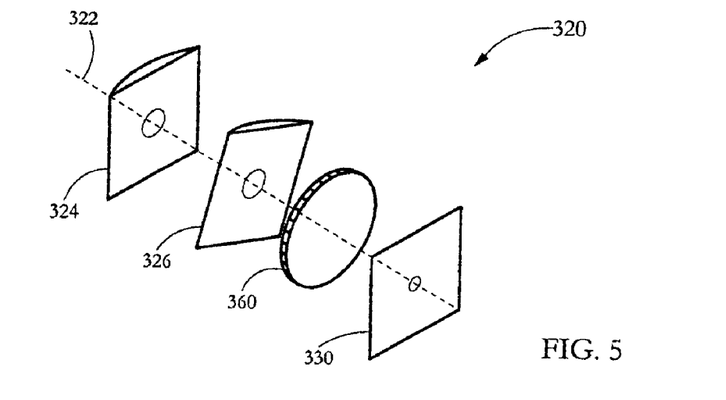
FIG. 5 shows yet another system configuration according to the present invention.

FIG. 5 shows a schematic isometric view of a focus-mode optical system 320 according to another embodiment of the present invention. The optical axis of system 320 is illustrated at 322. System 320 includes first and second cylindrical lenses 324, 326 of focal length f, and a spherical lens 360 of focal length $f_0$, situated after second lens 326. At least one of lenses 324, 326 is capable of rotation about the optical axis 322. An output plane or screen 330 is situated in the back focal plane of spherical lens 360, at a distance $f_0$ away from spherical lens 360. The working distance of system 320 is equal to $f_0$. Cylindrical lenses 324, 326 are separated by an optical distance $2f$, as described above with reference to FIGS. 1-A–B. Spherical lens 360 is situated a distance $s \approx 0$ after second cylindrical lens 326. Spherical lens 360 can be attached to the second, rotating cylindrical lens 326 in order to reduce the total length of system 320.

Irrespective of the placement of a focusing spherical lens in an incoming beam, the spot size at its back focal plane, $D_f$, is proportional to the divergence of the incoming beam, $\theta_{in}$:

$$D_f = \theta_{in} f_0, \qquad [20.1]$$

where $f_0$ is the focal length of the convergent spherical lens.

The variable spot size $D_f(\alpha)$ in the focal plane of spherical lens 360 is given by the (exact) formula:

$$D_f(\alpha)=(D_0 f_0/f)[(f/z_R)^2+\sin^2(\alpha)]^{1/2}=D_0 K(\alpha) \qquad [20.2]$$

In a geometrical optics approximation the variable spot size $D_{fg}(\alpha)$ is given by:

$$D_{fg}(\alpha)=D_0(f_0/f)\sin(\alpha)=D_0 K_g(\alpha) \qquad [20.3]$$

The minimum spot size is obtained for $\alpha=0$ and is given by:

$$D_{fm}=D_f(0)=(D_0 f_0/z_R)=\theta_{in} f_0 \qquad [20.4]$$

The minimum spot size of Eq. [20.4] is the minimum spot size which would be obtained in the focal plane of the same spherical lens of focal length $f_0$, without any intervening cylindrical optics, for an identical incoming beam having an incoming divergence $\theta_{in}$. In pure geometrical optics the following non-physical result is obtained:

$$D_{fmg}=D_{fg}(0)=0 \qquad [20.5]$$

The maximum spot size $D_{fM}$ corresponds to $\alpha=90°$ and is given by the exact relations:

$$D_{fM}=D_f(\pi/2)=(D_0 f_0/z_R)[1+(z_R/f)^2]^{1/2}=(D_0 f_0/f)[1+(f/z_R)^2]^{1/2} \qquad [20.6]$$

$$D_{fM}=\theta_{in} f_0[1+(z_R/f)^2]^{1/2} \qquad [20.7]$$

For a well collimated beam (geometrical optics approximation) the maximum spot size is:

$$D_{fMg}=D_{fg}(\pi/2)=D_0 f_0/f \qquad [20.8]$$

The exact dynamic range factor K and the geometrical optics dynamic range factor $K_g$ are given respectively by:

$$K=[1+(z_R/f)^2]^{1/2} \qquad [20.8]$$

$$K_g = \lim_{z_R \gg f} K = z_R/f \qquad [20.9]$$

A remarkable feature of the "focus-mode" arrangement shown in FIG. 5 is its large achievable dynamic range factor. Dynamic range factor values of 50 to 400 are readily achievable. The design of FIG. 5 is also remarkably flexible. The desired working distance determines the focal length of spherical lens 360. The desired dynamic range factor determines the required incoming beam collimation (the value of its Rayleigh range $z_R$) and the cylindrical lens characteristics. For a lower value of K and a large Rayleigh range, the positive-negative cylindrical lens configuration of FIGS. 3–4 can be more convenient than the positive-positive configuration of FIGS. 1-A–B. The depth of focus, or the extent over which the beam maintains approximately a round spot, can be a relevant parameter in certain applications. An estimate for this range is by considering the true Rayleigh range of the focused beam when the minimum spot is obtained, $z_{RDm}$, given by:

$$z_{RDm}=f_0^2/z_R \qquad [20.10]$$

One can estimate a deviation from the round spot within this "quasi-Rayleigh range" of about 10%, for the entire range of spot sizes at the working distance.

Focus-mode optical systems such as the system 320 shown in FIG. 5 can be particularly useful in beam delivery systems for industrial and medical lasers. The input beam can be collimated accordingly before entry into system 320, either using discrete lenses and free-spaces, or using optical fibers and collimating lenses. System 320 allows the use of a single laser for a relatively wide range of applications, by allowing relatively wide variations in the laser spot size at the target and thus allowing adjustments of the laser power density or the laser energy density at the target plane. Applications such as cutting and surface treatment for industrial lasers, and medical applications in dermatology and ophthalmology would benefit from variable spot size optical systems such as the ones described above.

A focus-mode system can be constructed by modifying the configuration shown in FIG. 3, by positioning a convergent spherical lens adjacent to the second cylindrical lens 126 opposite the first cylindrical lens 124. The target location where a symmetrically-scalable round spot is formed is then situated a distance $f_0$ away from the spherical lens, where $f_0$ is the focal length of the spherical lens.

(II) Collimated, Aligned Simple Astigmatic (ASA) Beams

Collimated ASA beams of intrinsic stigmatic type can be obtained by collimating an index-guided diode laser. The extent of such a beam over one of the transverse axes, for example the x-axis, is several times larger than the extent of the beam over the other transverse axis. A beam aspect ratio of 3:1 to 5:1 is typical.

There are in principle two ways of generating a variable-size round spot at a desired working distance (say, at infinity) using a laser source with a collimated elliptical beam. One way is to enlarge the small axis of the elliptical beam until it equals the large axis, and then to transform the resulting round, collimated laser beam into a variable-divergence beam. The second way is to reduce the large axis of the elliptical beam to make it equal to the small axis, and subsequently to transform the resulting round, collimated beam into a variable-divergence beam. Assume for example that we are interested in enlarging the small axis of the beam until it becomes as large as the larger axis. The enlargement could be achieved by using a negative-positive pair of cylindrical lenses, or a positive-positive pair. Reducing the larger axis of the beam can be achieved by switching the direction of light travel through the lens pair used for enlargement (i.e. switching the system input and output). Therefore, there are four different configurations that could be used to generate a round spot at a desired distance using an incoming ASA beam: small-to-large configuration using negative and positive cylindrical lenses (Galilean magnifying telescope with the positive lens rotating); small-to-large configuration using positive and positive cylindrical lenses (Keplerian magnifying telescope with rotating second lens); large-to-small configuration using positive and negative cylindrical lenses (Galilean demagnifying telescope with rotating negative lens); and large-to-small configuration using positive and positive cylindrical lenses (Keplerian demagnifying telescope with rotating second lens). Only one of the four possible configurations will be analyzed in detail below. The other three configurations will be readily apparent to the skilled artisan from the discussion below.

Figure 6:
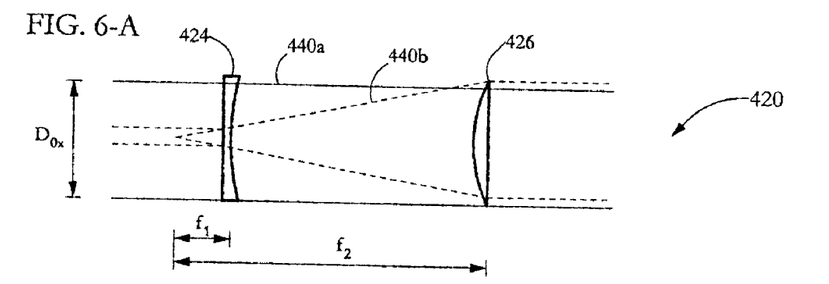

FIGS. 6-A–B show schematic views of a small-to-large cylindrical telescope 420 having a first, fixed, negative focus cylindrical lens 424, and a second, rotatable, positive focus cylindrical lens 426. Although the discussion below focuses on a projection-mode, variable divergence system, corresponding focus-mode systems can be constructed by adding an output spherical lens as described above. First lens 424 has a focal length $f_1 = -|f_1|$, while second lens 426 has a positive focal length $f_2$. First lens 424 is oriented so as to act only along the smaller beam size direction, or the y-direction. Second lens 426 is situated at the location where the light beam is round after first lens 424. This position corresponds approximately to a distance $f_2-f_1$ after first lens 424.

The incoming beam is collimated on both the x- and y-directions, and has both its x- and y-waists at first lens 424. The beam has a larger waist size along the x-axis, $D_{0x}$, than along the y-axis, $D_{0y}$. When second lens 426 is parallel with first lens 424, i.e. when second lens 426 acts also only along the y-axis, the configuration is a Galilean magnifying telescope (or afocal system), as illustrated in FIG. 6-A. The x-distribution 440a of the beam passes undisturbed through both cylindrical lenses 424, 426 and retains its size Dox. The y-distribution 440b is enlarged by $f_2/|f_1|>1$ by the Galilean afocal system. To obtain a collimated round spot after second lens 426, the magnification ratio of the telescope should equal the ratio of the beam sizes along the x- and y-directions:

$$D_{0x}/D_{0y}=f_2/|f_1| \qquad [21.1]$$

The divergence of the beam with both lenses in parallel position acting on y is minimum (zero in geometric optics limit), or equal to the smaller divergence of the larger axis, x:

$$\theta_m=\theta_x=D_{0x}/z_{Rx} \qquad [21.2]$$

FIG. 6-B illustrates the effect of rotating second cylindrical lens 426 by 90°. As shown, both the x- and y-distributions 444a–b of the light beam become divergent, with the maximum divergence angle $\theta_M$ given by:

$$\theta_M=D_{0x}/f_2=D_{0y}/|f_1| \qquad [21.3]$$

The cylindrical Galilean afocal optical system 420 with the rotating second lens 426 is a variable divergence source of light for a collimated ASA beam of intrinsic stigmatic type. The other three possible configurations can be analyzed similarly.

As the skilled artisan will appreciate from the preceding discussion, it is possible to construct projection-mode optical systems with variable spot sizes at large distances for collimated ASA beams of intrinsic stigmatic type. Adding a spherical lens after the second cylindrical lens allows generating focus-mode, variable spot sizes at a fixed working distance. Applications such as coupling to a fiber, material processing, or medical applications (dermatology) can benefit from the designs described above.

(III) Systems Using Cylindrical Mirrors

Generally, the lenses described above can be replaced by suitably-chosen mirrors. In the far infrared spectral domain, reflective optics are sometimes less expensive than refractive optics. Mirrors can also be of particular use when the chromatic aberrations are of concern. In general, many configurations using mirrors or mirrors and lenses can be conceived.

Figure 7:
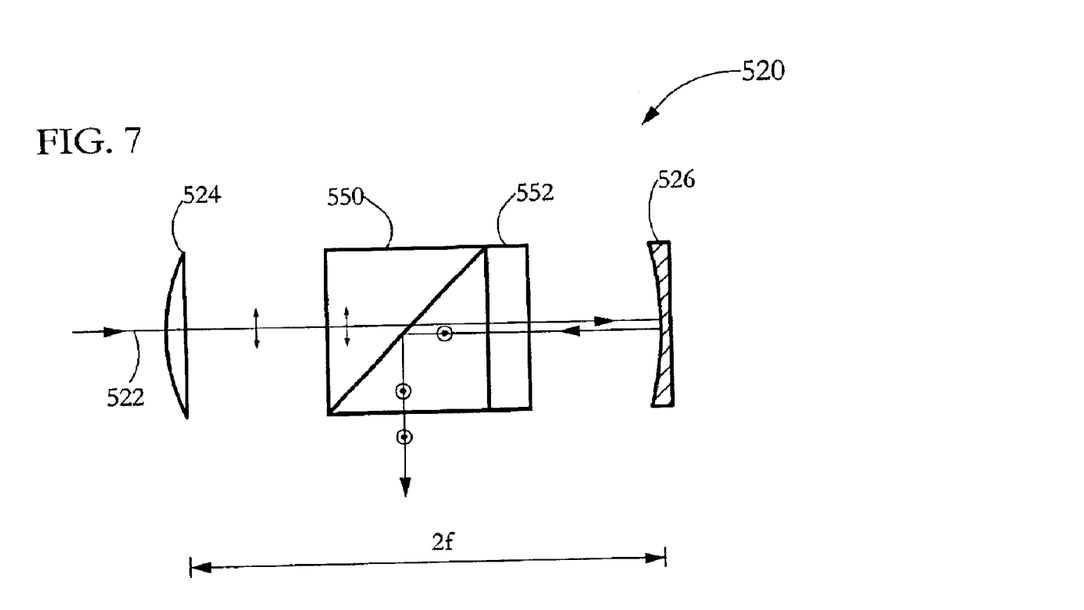
FIG. 7 is a schematic diagram of a system configuration including a cylindrical lens and a cylindrical mirror, according to another embodiment of the present invention.

FIG. 7 shows a configuration 520 using a first (input) cylindrical lens 524, and a second (output) cylindrical mirror 526 situated along the optical axis 522 of the incoming beam. Lens 524 is a converging lens of focal length f, acting along the y-axis. Mirror 526 is a converging, rotatable cylindrical mirror with a focal length f and a cylindrical radius of curvature 2f. A polarizing cube beam splitter (PCBS) 550 and an attached quarter-wave plate (QWP) 552 are positioned in the optical path between lens 524 and mirror 526.

An input ST, collimated beam, linearly polarized along the vertical direction, is incident on lens 524. The optical distance between the cylindrical lens 524 and the cylindrical mirror 526 is 2f. Thus, mirror 526 is positioned in the round spot of the light beam after its passage through PCBS 550.

The incoming beam is p-polarized inside PCBS 550 and is transmitted almost completely toward mirror 526. The beam reflected from mirror 526 becomes s-polarized inside PCBS 550 by passing a second time trough QWP 552, and is reflected almost completely downwards within PCBS 550. With mirror 526 oriented parallel to lens 524 (with both acting along the y-direction), the reflected beam after mirror 526 has a minimum divergence equal to that of the incoming beam. With mirror 526 rotated by 90° about the optical axis 522, the outgoing beam has a maximum divergence. The configuration shown in FIG. 7 otherwise satisfies the equations set forth above for the system shown in FIGS. 1-A–B, with $f_1=f_2=f$.

Figure 8:
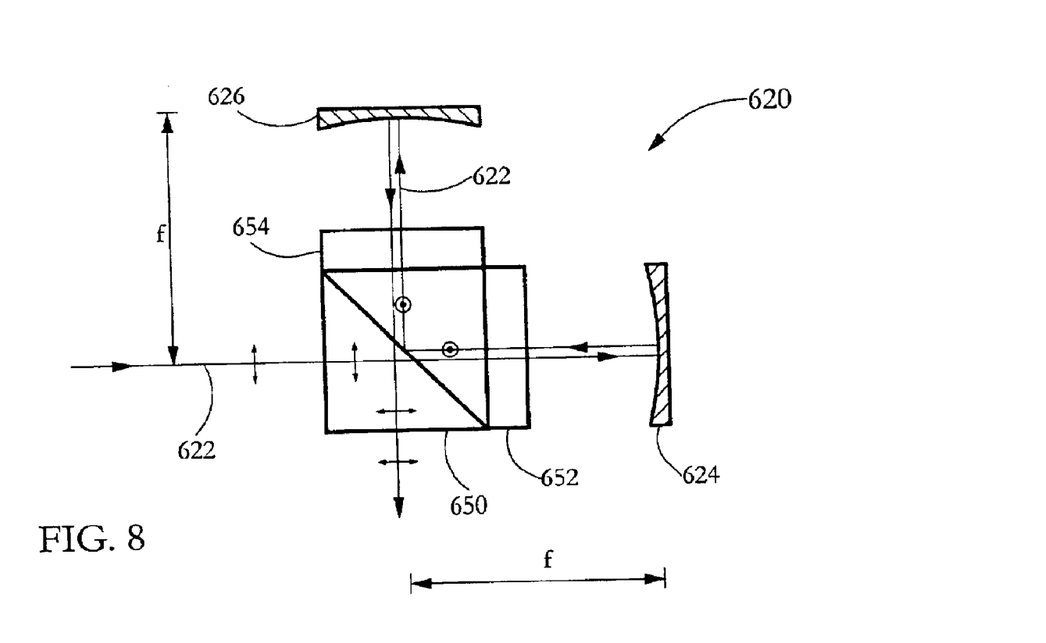
FIG. 8 is a schematic diagram of a system configuration including two cylindrical mirrors, according to another embodiment of the present invention.

FIG. 8 shows a configuration 620 including a first cylindrical mirror 624 and a second cylindrical mirror 626 situated along an optical axis 622. First mirror 624 has focusing power along the y- (vertical) axis, and has a focal length f and a cylindrical radius of curvature $2f$. Second mirror 626 is rotatable about the vertical axis of FIG. 8, and has the same focal length f and cylindrical radius of curvature $2f$. A polarizing cube beam splitter (PCBS) 650 and two attached quarter-wave plates (QWP) 652, 654 are positioned in the optical path between mirrors 624, 626. The optical distance between each mirror 624, 626 and the center of PCBS 650 is f.

A collimated ST beam, linearly polarized along the vertical direction, is incident on PCBS 650 along optical axis 622. The beam axis path through PCBS 650 is established by the polarization state of the beam. The incoming beam is p-polarized and is transmitted almost completely to first mirror 624 through the first QWP 652. After reflection by mirror 624, the light beam passes again through first QWP 652 and becomes s-polarized. The s-polarized beam is reflected upwards by PCBS 650, through second QWP 654 and toward second mirror 626. The beam reflected by second mirror 626 arrives inside PCBS 650 after a second pass through second QWP 654. The beam, now p-polarized inside PCBS 650, is transmitted almost completely downward toward the system output.

The divergence of the output beam is minimal and equal to the divergence of the incoming collimated beam for the mirrors in the position as drawn. The maximum divergence of the output beam is obtained for the second mirror 626 rotated with 90° about its optical axis in FIG. 8. Second mirror 626 is located at an optical distance equal to $2f$ from first mirror 624, where the round spot after first mirror 624 is located. Thus the incident beam will be affected by the pair of mirrors 624, 626 according to the equations described above for the configuration of FIGS. 1-A–B, with $f_1=f_2=f$.

(IV) Mechanical, Electrical and Computer Elements

The distances between the cylindrical lenses/mirrors affect the performances of all configurations, and are also slightly dependent on the input beam characteristics. Ideally, an optical system as described above is designed so as to allow a fine adjustment of these distances after the lenses/mirrors are assembled. Because this adjustment is done only once, during the assembly of the real device, expensive fine mechanisms can generally be avoided. A translational adjustment allowing a range of +/−3% of the nominal length would be of particular use. After the adjustment, a simple locking system (screws or glue) can be used to fix the translational position of the optical elements.

Suitable mechanical and/or electrical components can be provided for controlling and driving the relative rotation of the cylindrical elements. The spot size depends nonlinearly of the rotation angle α, as discussed in the detailed analysis of the configurations presented. Therefore, a fine rotation mechanism with good reproducibility and ideally no backlash is desirable. A rotating ring rigidly attached to the rotating lens/mirror holder can suffice. The holder should be well centered to the mechanical axis of the whole device, which should be coincident with the optical axis. An elastic washer can be provided to allow the necessary friction such as to avoid losing the desired position of the ring during operation, and therefore to keep the spot size at the desired value. If desired, several discrete angular positions corresponding to several discrete magnifications can be selected by appropriate ring indentations. A mechanical stop to limit the whole rotation range to 90 degree can be used. Thin line graduations on the outer tube and a mark on the rotating ring can also be used to control the angular position of the lens(es). More precise solutions may use gears to control the rotation of the ring, and stepper motors driven by appropriate electronics and computer software. Special software can be implemented to allow the precise control of the spot size by using a spot size optical detector (based, for example on pinhole/quadrant detectors) which will give a feedback signal to the computer to control and maintain the spot size at the desired value. Fine rotation control, with approximately 1 minute of angle resolution and reproducibility (especially when small spots are desired to be controlled in focus-mode configurations) can be obtained by using levers attached to the rotation ring and activated by fine translation mechanisms, as micrometric or differential screws. A focus-mode configuration coupled with a small spot size measuring system can be used as a sensor for very small angular movements, with a resolution in the range of 1 second of arc, for a limited range (several degrees) of angular movements.

Figure 9:
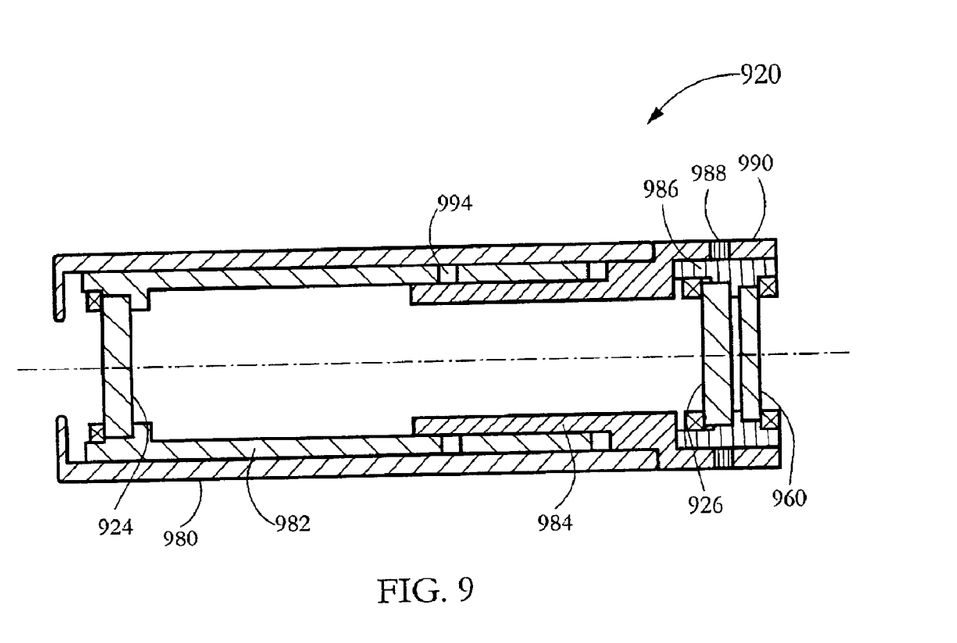
FIG. 9 illustrates in a longitudinal sectional view an implementation of mechanical components suitable for rotating one cylindrical lens with respect to another, according to an embodiment of the present invention.

FIG. 9 shows a side sectional view of a mounting/control arrangement suitable for controlling the operation of a three-lens system as described above. An optical system 920 includes a first cylindrical lens 924 rigidly mounted within a protective housing 980. Lens 924 is mounted within a fixed cylindrical lens holder 982, which is in turn fixedly attached to housing 980. A block holder 984 is fixedly mounted within lens holder 982. The translational position of block holder 984 is adjusted during the assembly of system 920 to ensure that a second cylindrical lens 926 is positioned at a desired distance $(2f)$ away from first lens 924. Once block holder 984 is positioned at the desired location, it is affixed to lens holder 982 by inserting screws through a set of holes 994 defined in the wall of lens holder 982, and pressing the screws to the surface of block holder 984.

Second cylindrical lens 926 and an attached spherical lens 960 are rigidly mounted on a rotatable lens holder 986. The translational position of lens holder 986 is held fixed by a locking flange 988 which holds lens holder 986 against block holder 984. A rotatable handling ring 990 is rigidly coupled to lens holder 986, for coupling an external rotational driving force to lens holder 986 so as to rotate second lens 926.

Cylindrical lenses 924, 926 are identical, and have a focal length f=50 mm. The spherical lens 960 has a focal length $f_0$=140 mm. The device acts on a 3–4 mm diameter collimated, low power laser beam (red laser diode), and provides at the working distance a round spot continuously adjustable from a minimum of approximately 50 µm to a maximum of approximately 12 mm.

It will be clear to one skilled in the art that the above embodiments may be altered in many ways without departing from the scope of the invention. Accordingly, the scope of the invention should be determined by the following claims and their legal equivalents.

What is claimed is:

1. An optical method comprising:

generating a symmetrically-scalable light spot on a target positioned at a working location by passing a light beam sequentially through a first cylindrical optical element and a second cylindrical optical element, the second cylindrical optical element being separated from the first cylindrical optical element by a distance chosen such that a collimated input beam incident on the first cylindrical optical element forms a circular spot at the second cylindrical optical element after passing through the first cylindrical optical element; and symmetrically scaling the spot at the working location by adjusting an angle between a principal axis of the first cylindrical optical element and a principal axis of the second cylindrical optical element by rotating at least one of the first cylindrical optical element and the second cylindrical optical element.

2. The method of claim 1, wherein the second cylindrical optical element is positioned at an optical distance from the first cylindrical optical element substantially equal to twice a focal length of the first cylindrical optical element.

3. The method of claim 1, wherein the first cylindrical optical element and the second cylindrical optical element are separated solely by a free apace light beam path.

4. The method of claim 1, wherein:

the first cylindrical optical element comprises a first cylindrical lens; and the second cylindrical optical element comprises a second cylindrical lens.

5. The method of claim 4, wherein the second cylindrical lens is positioned an optical distance $2f_1$ away from the first cylindrical lens, wherein $f_1$ is a focal length of the first cylindrical lens.

6. The method of claim 5, wherein the first cylindrical lens and the second cylindrical lens are converging.

7. The method of claim 5, wherein the first cylindrical lens is converging, and the second cylindrical lens is diverging.

8. The method of claim 5, wherein the first cylindrical lens is diverging, and the second cylindrical lens is converging.

9. The method of claim 8, further comprising passing the light beam through a spherical lens positioned in an optical path between the first cylindrical lens and the second cylindrical lens.

10. The method of claim 5, wherein:

the second cylindrical lens is converging; and the second cylindrical lens is more powerful than the first cylindrical lens.

11. The method of claim 5, further comprising passing the light beam through a spherical lens positioned in an optical path of the light beam after the second cylindrical lens.

12. The method of claim 1, further comprising passing the light beam through a pair of spherical lenses positioned between the first cylindrical lens and the second cylindrical lens so as to image a principal plane of the first cylindrical lens onto a principal plane of the second cylindrical lens.

13. The method of claim 1, wherein one of the first cylindrical optical element and the second cylindrical optical element comprises a cylindrical mirror.

14. The method of claim 13, wherein another of the first cylindrical optical element and the second cylindrical optical element comprises a cylindrical lens.

15. The method of claim 13, wherein:

the first cylindrical optical element comprises a first cylindrical mirror; and the second cylindrical optical element comprises a second cylindrical mirror.

16. The method of claim 1, further comprising passing the light beam through a polarizing beam splitter and quarter wave plate positioned in an optical path between the first cylindrical optical element and the second cylindrical optical element.

17. The method of claim 1, wherein the target comprises a part of a patient.

18. The method of claim 1, wherein the target comprises a projection screen.

19. The method of claim 1, further comprising processing the target by generating the spot on the target, wherein the target is an object.

20. The method of claim 1, wherein the light beam is intrinsic stigmatic and collimated.

21. The method of claim 20, wherein the light beam is stigmatic.

22. The method of claim 20, wherein the light beam is aligned simple astigmatic.

23. An optical method comprising:

generating a round spot on a target positioned at a working location by passing a collimated, intrinsic stigmatic light beam sequentially through a first cylindrical lens and a second cylindrical lens, the second cylindrical lens being separated from the first cylindrical lens by about twice a focal length of the first cylindrical lens; and adjusting a diameter of the round spot at the working location by adjusting an angle between a principal axis of the first cylindrical lens and a principal axis of the second cylindrical lens by rotating at least one of the first cylindrical lens and the second cylindrical lens.

24. An optical system comprising:

a first cylindrical optical element for receiving an input light beam; and a second cylindrical optical element positioned at a round spot location optically subsequent to the first cylindrical optical element;

wherein at least one of the first cylindrical optical element and the second cylindrical optical element is rotatable so as to adjust an angle between a principal axis of the first cylindrical optical element and a principal axis of the second cylindrical optical element to symmetrically scale a light beam spot at a target location.

25. The system of claim 24, wherein the second cylindrical optical element is positioned at an optical distance from the first cylindrical optical element substantially equal to twice a focal length of the first cylindrical optical element.

26. The system of claim 24, wherein the first cylindrical optical element and the second cylindrical optical element are separated solely by a free space light beam path.

27. The system of claim 24, wherein:

the first cylindrical optical element comprises a first cylindrical lens; and the second cylindrical optical element comprises a second cylindrical lens.

28. The system of claim 27, wherein the second cylindrical lens is positioned an optical distance $2f_1$ away from the first cylindrical lens, wherein $f_1$ is a focal length of the first cylindrical lens.

29. The system of claim 28, wherein the first cylindrical lens and the second cylindrical lens are converging.

30. The system of claim 28, wherein the first cylindrical lens is converging, and the second cylindrical lens is diverging.

31. The system of claim 28, wherein the first cylindrical lens is diverging, and the second cylindrical lens is converging.

32. The system of claim 31, further comprising a spherical lens positioned in an optical path between the first cylindrical lens and the second cylindrical lens.

33. The system of claim 28, wherein:
the second cylindrical lens is converging; and
the second cylindrical lens is more powerful than the first cylindrical lens.

34. The system of claim 28, further comprising a spherical lens positioned in an optical path of the light beam after the second cylindrical lens.

35. The system of claim 27, further comprising a pair of spherical lenses positioned between the first cylindrical lens and the second cylindrical lens so as to spot a principal plane of the first cylindrical lens onto a principal plane of the second cylindrical lens.

36. The system of claim 24, wherein one of the first cylindrical optical element and the second cylindrical optical element comprises a cylindrical mirror.

37. The system of claim 36, wherein another of the first cylindrical optical element and the second cylindrical optical element comprises a cylindrical lens.

38. The system of claim 36, wherein:
the first cylindrical optical element comprises a first cylindrical mirror; and
the second cylindrical optical element comprises a second cylindrical mirror.

39. The system of claim 24, further comprising a polarizing beam splitter and quarter wave plate positioned in an optical path between the first cylindrical optical element and the second cylindrical optical element.

40. The system of claim 24, further comprising a laser for generating the light beam.

41. An optical system comprising:
a first cylindrical lens for receiving a collimated light beam;
a second cylindrical lens in optical communication with the first cylindrical lens, for receiving the beam after passage through the first cylindrical lens, the second lens being positioned relative to the first lens at a distance substantially equal to twice a focal length of the first cylindrical lens; and
a rotation device mechanically connected to at least one of the first lens and the second lens, for rotating the at least one of the first lens and the second lens about the optical axis, to adjust an angle between a principal axis of the first lens and a principal axis of the second lens, thereby controlling a focusing of the beam.

42. An optical system comprising:
first cylindrical optical means for receiving an input light beam; and
second cylindrical optical means positioned at a round spot location optically subsequent to the first cylindrical optical means; and
rotation means coupled to at least one of the first cylindrical optical means and the second cylindrical optical means, for adjusting an angle between a principal axis of the first cylindrical optical means and a principal axis of the second cylindrical optical means to symmetrically scale a light beam spot at a target location.

43. An optical system comprising:
a first cylindrical lens having a first focal length, for receiving a collimated light beam;
a second cylindrical lens having a second focal length equal and opposite in sign to the first focal length, the second cylindrical lens being positioned physically adjacent to the first cylindrical lens, for receiving the beam after passage through the first cylindrical lens; and
a projection screen positioned away from the second cylindrical lens at a distance at least a factor of ten larger than a magnitude of the first focal length, for receiving the beam after passage through the second cylindrical lens, wherein the projection screen and the second cylindrical lens are not separated by any intervening optical element;
wherein the second cylindrical lens is rotatable with respect to the first cylindrical lens so as to adjust an angle between a principal axis of the first cylindrical lens and
a principal axis of the second cylindrical lens, for generating a symmetrically-scalable spot on the projection screen.

* * * * *

UNITED STATES PATENT AND TRADEMARK OFFICE
CERTIFICATE OF CORRECTION

PATENT NO.       : 6,717,745 B2
APPLICATION NO.  : 10/143215
DATED            : April 6, 2004
INVENTOR(S)      : Nemes It is certified that error appears in the above-identified patent and that said Letters Patent is hereby corrected as shown below:

Column 4, line 32, Eq. [2], replace "$a = (1/2)\, (M^2{}_x - M^2 y)_2$" with
-- $a = (1/2)\, (M^2{}_x - M^2 y)^2$ --.

Column 4, line 67, Eq. [3], replace "$a >> (M^2{}_x M^2\, y$" with
-- $a << M^2{}_x M^2\, y$ --.

Column 5, line 5, Eq. [4], replace "$1 - \varepsilon < M^2{}_x / M^2\, y > 1 + \varepsilon$" with
-- $1 - \varepsilon < M^2{}_x / M^2\, y < 1 + \varepsilon$ --.

Column 5, line 23, replace "$M^2{}_x\ 32\ 1.5$" with -- $M^2{}_x = 1.5$ --.

Column 6, line 5, replace "angle a" with -- angle $\alpha$ --.

Column 6, line 48, Eq. [8.1], in the parentheses between the sign + and $\sin^2(\alpha)$, replace "$(4 - f_2/f_1)$" with --$(4\ f_2/f_1)$ --.

Column 7, line 25, Eq. [12.2], before the square bracket, replace "$K32$" with -- $K =$ --.

Column 8, line 6, Eq. [14], after the last = sign, replace "$-|d_{20}$" with -- $-|d_{20}|$ --.

Column 8, line 20, in Eq. [16], from the last square bracket on, replace "$]^{1/2}\, D_0\, K_{vg}(\alpha)$" with -- $]^{1/2} = D_0\, K_{vg}(\alpha)$ --.

Column 8, line 47, replace "$-\ |f_2 <0$" with -- $-\ |f_2| <0$ --.

Column 9, line 7, Eq. [18.6], after the last / sign, replace: "$/(f_1 = |f_2|)$" with -- $/(f_1 + |f_2|)$ --.

Column 10, lines 55-57, replace Eqs. [19.6] and [19.7], with

-- $K_g = \lim_{z_R >> f} K = z_R / f$   [19.9] --.

Column 11, lines 2-4, replace Eqs. [19.8] and [19.9] with:

-- $D_M = \theta_{Mg} d = D_0 d / f$   [19.10]

$D_m = \theta_{mg} d = D_0 d / z_R$   [19.11] --.

UNITED STATES PATENT AND TRADEMARK OFFICE
CERTIFICATE OF CORRECTION

PATENT NO. : 6,717,745 B2
APPLICATION NO. : 10/143215
DATED : April 6, 2004
INVENTOR(S) : Nemes

It is certified that error appears in the above-identified patent and that said Letters Patent is hereby corrected as shown below:

Column 17, line 26, replace "apace" with -- space --.

Column 20, line 41, remove the indentation of the last paragraph of claim 43, such that the last two paragraphs of claim 43 are combined into a single paragraph.

Signed and Sealed this

Twenty-third Day of January, 2007

JON W. DUDAS
*Director of the United States Patent and Trademark Office*